Patented Mar. 14, 1939

2,150,316

UNITED STATES PATENT OFFICE 2,150,316

VITAMIN CONCENTRATE AND PROCESS FOR PRODUCING SAME

André E. Briod, Belleville, and Bion R. East, East Orange, N. J., assignors to National Oil Products Company, Harrison, N. J., a corporation of New Jersey No Drawing. Original application July 16, 1936, Serial No. 90,888. Divided and this application October 23, 1937, Serial No. 170,582

8 Claims. (Cl. 99—11)

This invention relates to a new method of incorporating vitamin concentrates, particularly vitamins A and D, to milk products and other food products.

It more particularly concerns itself with the preparation of so-called vitamin D milk, the use and value of which have become well-known in the last few years.

The discovery of vitamins has brought a widespread use of various products enriched with such vitamins; and, while the necessity of some of these products may be open to question, there is no such doubt in regard to vitamin D milk. With the approval of numerous medical and nutritional authorities, it has become firmly established as a food of enhanced nutritional value, in which the specific virtues of milk and vitamin D are combined in a most useful manner.

While vitamin D milk can be produced by various methods, such as addition of irradiated products to milk, direct irradiation, feeding of irradiated and other vitamin D products to cows, etc., our invention has to do with the production of vitamin D milk by the addition of naturally-occurring vitamin concentrates to milk.

Cod liver oil has long been known to possess special therapeutic qualities, but it is only with the discovery of the oil-soluble vitamins that these qualities became fully understood. The further discovery that the vitamins were contained in the unsaponifiable fraction of cod liver oil and other fish liver oils led to new methods of administration of these vitamins. Their concentration is now well known and widely practiced.

Such fish liver oil concentrates were first administered in tablet form, or dissolved to a desired strength in other oils such as corn oil. While the improvement over the necessity of taking cod liver oil was great, it still presented certain difficulties, particularly with young children.

Vitamin D milk, made with cod liver oil concentrates, was therefore introduced with the idea of overcoming these difficulties, while providing an automatic source of vitamin D of known and controlled potency. The close association of the vitamin with the calcium and phosphorus of the milk was also viewed as an added advantage in this new method of providing vitamin D in the daily diet.

The incorporation of cod liver oil concentrate to milk, particularly on a commercial scale, did not prove as simple as it sounded, however. A method was finally developed where the concentrate, which is a mixture of crystalline, gel-like and liquid fractions practically free from saponifiable constituents, was dissolved in a neutral oil, such as corn oil, to a predetermined vitamin potency. This standardized oil solution of the concentrate was used by the dairies to make vitamin D milk in the following manner:

A calculated amount of the oil solution of concentrate was measured and emulsified in a small portion of milk, using a suitable emulsifier or homogenizer for this operation. The concentrated emulsion in milk was then mixed into the whole batch, which was subsequently pasteurized and bottled as usual.

The above method had some very serious drawbacks, chief among which may be mentioned:

A. The concentrate had to be dissolved in a neutral oil, thus necessitating introduction into the milk of a substance foreign to the concentrate or the milk.

B. The pre-emulsification of the oil solution of concentrate in the milk at the dairy was troublesome, and also unsatisfactory from a sanitary standpoint.

C. The emulsification or homogenization in whole milk was not properly effective and prevented the milk from having a reasonably constant vitamin D potency throughout the batch. In addition to its separation with the cream, the oil solution of concentrate would often separate as free oil globules on top of the milk, particularly after pasteurization of the milk, which had the effect of helping the separation and de-emulsification of the added oil solution of concentrate.

D. The oil used as a diluent would oxidize, with formation of undesirable flavors both in the concentrate and in the milk, and with detrimental effect on the vitamin A and D potency of the material.

E. The presence of the concentrate in the milk thus treated could be detected by taste comparison with untreated milk. This was due to the ineffectiveness of the emulsification of the vitamin oil solution in whole milk, together with the effect of oxidation of the oil on the taste of both the milk and the concentrate.

It can readily be seen that the above disadvantages were quite serious. Our new method has overcome all of these and has introduced other desirable features which have proved quite valuable to the art and which have greatly simplified the preparation of vitamin D milk with concentrates from fish liver oils.

We have found that the direct homogenization of cod liver concentrate, without oil diluent, in evaporated milk or in cream, followed by canning and sterilization of the emulsion in sealed cans, gave us a product which was eminently suited to the preparation of vitamin D milk. Contrary to our expectations, we found that the vitamin A and D potency of the material was not affected by the sterilization of the material, which sterilization is required to keep it fresh indefinitely in the sealed can. The homogenization in evaporated milk or in cream was so much superior to homogenization in whole milk that the stability of the emulsion was not disturbed by sterilization. This is apparently due to the greater concentration of emulsifying ingredients in evaporated milk or in cream as against an equal amount of whole milk.

In addition, we have found that the stable sterilized emulsion thus produced, when mixed in whole milk, remained evenly distributed throughout the whole for a much longer period, instead of quickly separating with the cream of the milk. This is a distinct advantage for a material of this type, where it is sought to incorporate the vitamin potency throughout the whole, particularly if some of the cream has to be removed, as in the feeding of some young infants.

The finely divided nature of vitamin D in the product is also an advantage and its close association with the calcium of the milk appears to enhance its biological effect. Unit for unit, vitamin D milk has been shown to be superior to an equivalent amount of vitamin D in oil dilution.

We have also found that, through some unexpected effect of sterilization in the presence of evaporated milk or cream on the taste of the concentrate, which taste is distinctly modified, the resulting emulsified product gives a vitamin D milk which cannot be distinguished from ordinary milk, even by experts on milk taste. This in itself is a great improvement over results obtained in prior practice.

The ease of addition of this sterilized product to milk, with which it mixes very readily to form a homogeneous mass, has proved of great value to the art, and the simplicity of this new method is adequately shown in the following example, which is given simply to illustrate one of its many applications:

*Example*

Fifty gm. of a cod liver oil concentrate, consisting of the refined unsaponifiable portion of cod liver oil and containing 10,000 U. S. P. units of vitamin D and 50,000 U. S. P. units of vitamin A per gram, is homogenized with 950 gm. of freshly separated cream or with 950 gm. of evaporated milk produced from whole milk by removal of half of its water content. The emulsion is then canned, and the cans sealed and sterilized for twenty minutes at 242° F.

At the dairy, each 6 oz. can of the material will produce approximately 213 quarts of vitamin D milk containing 400 U. S. P. units of vitamin D per quart, and also an additional 2,000 U. S. P. units of vitamin A per quart. The vitamin D milk is obtained very simply by pouring the sterilized contents of the can in the 213 quarts of milk, mixing and pasteurizing as usual.

It is obvious that the proportion of concentrate in the canned emulsion can vary within considerable limits. Usually, the strength can best be determined according to the quantity of vitamin D which it is desired to produce daily. A large production, for example, will call for a product having the highest practical proportion of concentrate consistent with stability of the emulsion during and after sterilization. A small production will call for a more dilute product, though an emulsion containing less than 100 U. S. P. units of vitamin D per gram is not usually practical, however. The various potencies of different batches of concentrate will also modify the percentage of concentrate needed in an emulsion which is to have a predetermined vitamin D potency.

As a further desirable precaution to protect the vitamin potency and taste of the material, the cans can be sealed under vacuum, after removal of air from the filled can.

The medium used for emulsification of the concentrate can be changed to suit special demand or special circumstances. It is possible, for example, to make a reconstructed evaporated milk from milk powder and to homogenize the concentrate therein, without departing from the contemplated scope of our invention. This reconstructed evaporated milk, made from milk powder to approximate the composition of evaporated milk made from whole milk, also contains emulsifying ingredients in suitable state and concentration for the production of a stable homogenized and sterilized emulsion of vitamin concentrate. It is therefore intended that our specification and claims, when they refer to evaporated milk, also include under that term the liquid carriers produced by redissolving milk powder to a composition approximating that of evaporated milk made directly from whole milk by removal of part of its water content.

The concentrated emulsion can also be dried by suitable means, such as spray drying or drying over rollers, if a concentrated powdered product seems more desirable for addition of vitamin concentrate to powdered milk, for example.

Other oils than cod liver oil can be used to produce the concentrate, and refined fish oils of high vitamin A and D potency, such as tuna liver oil, can be used with or without further concentration of the vitamin potency. Concentrates which consist mainly of vitamin D from fish liver oil can also be prepared by known methods and used in the performance of our invention. While the use of vitamin concentrates obtained from marine oils is preferred, it is obvious that equivalent vitamin D and/or vitamin A and D concentrates, derived from other sources may be used in lieu of concentrates obtained from marine oils.

Furthermore, it is evident that our new products can also be used to incorporate vitamins A and D to foods other than milk, as for example bread or other cereals, and to all preparations where the addition of an easily dispersed emulsion of oil-soluble vitamins is a distinct advantage.

By "milk product carrier" and "milk product carriers" in our specification and claims, we mean the products of the group consisting of cream and evaporated milk as hereinbefore qualified.

Since certain changes in carrying out the above process and certain modifications in the composition which embody the invention may be made without departing from its scope, it is intended that all matter contained in the above description shall be interpreted as illustrative and not in a limiting sence.

This application is a division of our application for U. S. Letters Patent Serial Number 90,888, filed July 16, 1936.

Having described our invention, what we claim as new and desire to secure by Letters Patent is:

1. A process for producing a vitamin D concentrate adapted for addition to foods, which consists in emulsifying vitamin D concentrate with a milk product carrier selected from the class consisting of cream and evaporated milk, canning and sterilizing the resulting emulsion.

2. A process for producing a vitamin A and D concentrate adapted for addition to foods, which consists in emulsifying vitamin A and D concentrate with a milk product carrier selected from the class consisting of cream and evaporated milk, canning the resulting emulsion and sterilizing the canned material.

3. A process for producing a concentrate adapted for addition to foods, which consists in emulsifying fish liver oil concentrate with a milk product carrier selected from the class consisting of cream and evaporated milk, canning and sterilizing the resulting emulsion.

4. A sterile vitamin D concentrate adapted for addition to foods consisting of a vitamin D concentrate uniformly dispersed in a milk product carrier selected from the group consisting of cream and evaporated milk.

5. A sterile vitamin A and D concentrate adapted for addition to foods consisting of a vitamin A and D concentrate uniformly dispersed in a milk product carrier selected from the group consisting of cream and evaporated milk.

6. A sterile concentrate adapted for addition to foods consisting of a fish liver oil concentrate uniformly dispersed in a milk product carrier selected from the group consisting of cream and evaporated milk.

7. A sterile vitamin D concentrate adapted for addition to whole milk consisting of vitamin D concentrate uniformly dispersed in cream.

8. A sterile vitamin D concentrate adapted for addition to whole milk consisting of a vitamin D concentrate uniformly dispersed in evaporated milk.

ANDRÉ E. BRIOD.
BION R. EAST.